United States Patent [19]

Kuroki

[11] Patent Number: 5,257,682
[45] Date of Patent: Nov. 2, 1993

[54] HUB CLUTCH ASSEMBLY

[75] Inventor: Tadashi Kuroki, Tochigi, Japan

[73] Assignee: Tochigifujisangyo Kabushiki Kaisha, Tochigi, Japan

[21] Appl. No.: 869,444

[22] Filed: Apr. 16, 1992

[30] Foreign Application Priority Data

Apr. 18, 1991 [JP] Japan .................... 3-086800

[51] Int. Cl.⁵ .................. B60K 17/35; F16D 25/04
[52] U.S. Cl. .................. 192/88 A; 92/98 D; 192/67 R; 192/85 A
[58] Field of Search ........... 192/88 A, 85 A, 106 R, 192/67 R, 85 V; 92/91, 98 D, 82

[56] References Cited

U.S. PATENT DOCUMENTS

| | | | |
|---|---|---|---|
| 4,718,527 | 1/1988 | Kurihara | 192/67 R X |
| 4,817,752 | 4/1989 | Lobo et al. | 192/88 A X |
| 4,960,192 | 10/1990 | Kurihara | 192/67 R |
| 5,085,304 | 2/1992 | Barroso | 192/67 R |

FOREIGN PATENT DOCUMENTS 732449 3/1943 Fed. Rep. of Germany .
151103 8/1985 Japan .
347511 4/1931 United Kingdom .
2149028 6/1985 United Kingdom .

*Primary Examiner*—Rodney H. Bonck
*Attorney, Agent, or Firm*—Graham & James

[57] ABSTRACT

A hub clutch assembly for a vehicle which comprises a drive axle, a wheel, and a housing of a closed structure. The wheel is fixedly mounted on the housing. A clutch is movable between a connecting position where the housing and the drive axle are connected to each other, and a disconnecting position where the housing and the drive axle are disconnected from each other. An actuator is supplied with pressure to move the clutch to either the connecting position or the disconnecting position. A biasing element is provided for biasing the clutch both to the connecting and disconnecting positions. A closed chamber is defined between the housing and the actuator. A valve is provided for allowing the pressure to escape from the closed chamber to the actuator when the actuator is inoperative and for cutting off movement of the pressure when the actuator is operative.

4 Claims, 3 Drawing Sheets

HUB CLUTCH ASSEMBLY

BACKGROUND OF THE INVENTION

1. Field of the Invention

The present invention relates to a hub clutch assembly for a vehicle, for engaging and disengaging a drive axle to and from a wheel.

2. Description of the Prior Art

A "DEVICE FOR DISCONNECTING WHEEL FROM OPTIONAL DRIVE FOR AXLE" is disclosed in Japanese Patent Application Laid-Open No. 60-151103. The device is arranged such that, in a four-wheel drive (4WD) vehicle, a pair of front wheels or a rear wheels on the disconnected side are disconnected from their respective drive axles at two-wheel drive running, to prevent vibration or noises, and to improve specific fuel consumption and durability. The device comprises a clutch for connecting and disconnecting one of the drive axles to and from a corresponding wheel and an actuator for operating the clutch.

In the above-described device, the actuator is formed by utilization of a housing on the side of the wheel as a cylinder.

The housing is constructed as a hermetic or closed structure in order to protect an interior mechanism within the housing from foreign matters such as dust or dirt, muddy water or the like, and a closed chamber is defined between the actuator and a top of the housing.

There are situations in which the temperature inside the closed chamber is brought to a hundred and several ten degrees (°C.) due to heat from the brakes, and internal pressure is raised to approximately 1.35 atm. Further, there is a fear that, if pressure leaking from the side of the actuator accumulates, the internal pressure will be further raised. Also, there is a fear that malfunction of the clutch may occur due to internal pressure within the closed chamber, or that operation of the actuator will be prevented in such a way that the clutch cannot operate normally. In order to prevent these situations from arising, an opening on which a filter is mounted has been provided in the closed chamber.

However, it is impossible for the filter to perfectly prevent the foreign matters from invading, and there is a fear that, if invading muddy water becomes frozen and solidified, the clutch will become inoperable.

SUMMARY OF THE INVENTION

It is therefore an object of the invention to provide a hub clutch assembly in which a clutch can maintain its normal function inside a closed structure housing.

According to the invention, there is provided a hub clutch assembly for a vehicle which comprises a drive axle and a wheel, the hub clutch assembly comprising:

a closed structure housing, the wheel being fixedly mounted on the housing;

a clutch movable between a connecting position where the housing and the drive axle are connected to each other and a disconnecting position where the housing and the drive axle are disconnected from each other;

an actuator supplied with pressure to move the clutch to either the connecting position or the disconnecting position;

biasing means for biasing the clutch to both the connecting and disconnecting positions;

a closed chamber defined between the housing and the actuator; and valve means for allowing the pressure to escape from the closed chamber into the actuator when the actuator is inoperative and for cutting off movement of the pressure when the actuator is operative.

With the arrangement of the invention, internal pressure such as positive or negative pressure within the closed chamber, which prevents movement of the actuator in an operating direction, escapes, by the valve means, from the closed chamber toward the actuator when the actuator is inoperative. Further, when the actuator is operative, pressure is prevented from leaking toward the closed chamber by the valve means. Thus, the actuator operates normally because the internal pressure within the closed chamber does not interfere with the actuator and because there is no pressure leakage. In addition, because the housing is in the form of a closed structure foreign matters such as dirt, dust and muddy water do not invade the housing. Thus, the normal function of the hub clutch is maintained for a long period of time.

As described above, the hub clutch assembly according to the invention is arranged such that the internal pressure within the closed chamber escapes to the actuator through the valve means when the actuator is inoperative. Accordingly, the actuator is released from the influence of the closed chamber when the housing is a closed structure so that foreign matters are prevented from invading into the housing. Thus, the normal function is maintained for a long time.

DETAILED DESCRIPTION OF THE PREFERRED EMBODIMENTS

Figure 1:
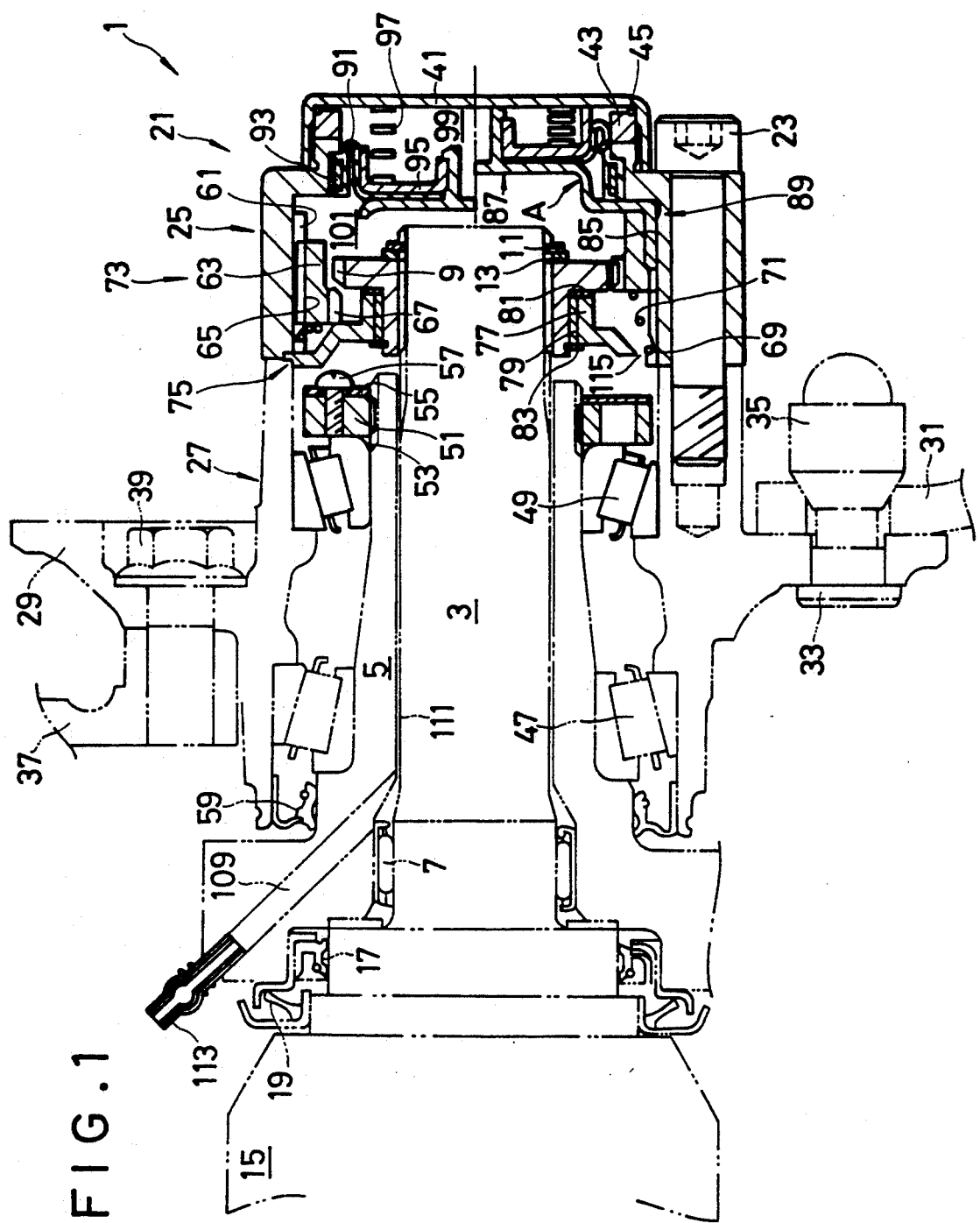
FIG. 1 is a cross-sectional view showing a hub clutch assembly according to a first embodiment of the invention.
Figure 2:
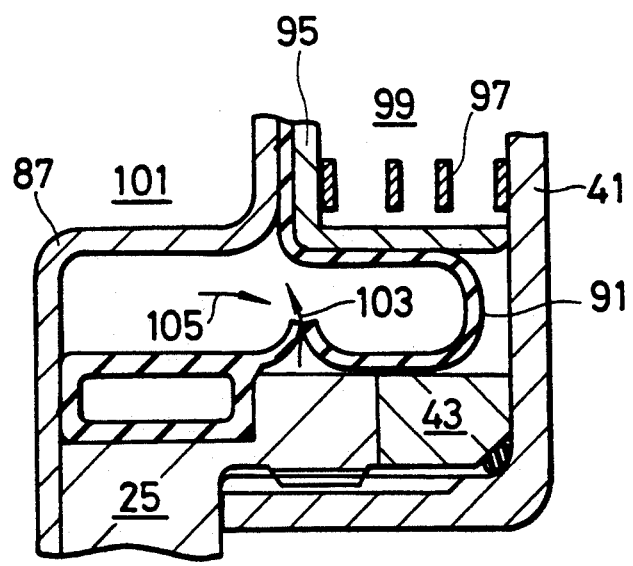
FIG. 2 is an enlarged view of a portion of the hub clutch assembly indicated by A in FIG. 1.
Figure 3:
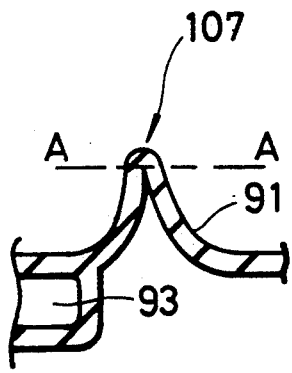
FIG. 3 is a schematic cross-sectional view showing a method of molding a check valve which is employed in the first embodiment.

Referring first to FIGS. 1 through 3, a hub clutch assembly according to a first embodiment of the invention is shown.

The hub clutch assembly 1 according to the first embodiment of the invention is utilized in one of a pair of forward wheels of a part-time 4WD (four-wheel drive) vehicle in which the front wheels are cut off from a body of the vehicle. Hereunder, the hub clutch assembly 1 on the right-hand front wheel will be used as an example. In this connection, left- and right-hand directions with reference to the vehicle and FIG. 1, and parts, and elements or the like which are not designated by reference numerals are not illustrated.

As shown in FIG. 1, the vehicle has a right-hand drive axle 3 which is supported within a hollow spindle 5 on the side of the vehicle body through a bearing 7. A drive gear 9 is spline-connected to a right-hand end of the axle 3 and is positioned and prevented from slipping off by a snap ring 11 and a washer 13. The axle 3 has a left-hand end portion which is connected to a constantvelocity coupling 15. A pair of seals 17 and 19 are arranged between the axle 3 and the spindle 5.

A housing 21 includes a top 25 and a wheel hub 27 which are unitarily connected to each other by a bolt 23. The wheel hub 27 has a flange 29 on which a right-hand front wheel 31 is fixedly mounted by bolts 33 and nuts 35. A brake disc 37 is fixedly mounted on the flange 29 by bolts 39. An end cover 41 is threadedly engaged with the top 25. A space between the end cover 41 and the top 25 is brought to an air-tight condition by a ring 43 and an O-ring 45.

The housing 21 is supported by the spindle 5 thorough a pair of bearings 47 and 49. The spindle 5 has a right-hand end portion with which a pressure regulating nut 51 for the bearings 47 and 49 is threadedly engaged. A detent element 55 engaged with a groove 53 in the spindle 5 is fixedly mounted on the nut 51 by bolts 57. A seal 59 is arranged between the left-hand end of the housing 21 and the spindle 5.

A spline 61 is provided on an inner periphery of the top 25 of housing 21. A spline 65 on an outer periphery of a slide gear 63 is engaged with the spline 61. The slide gear 63 is connected to the housing 21 for axial movement. The slide gear 63 has an inner periphery on which a gear 67 engageable with and disengageable from the drive gear 9 is provided. A spring 71 is arranged between a circumferential groove 69 formed in the spline 61 and the slide gear 63, for biasing the slide gear 63 toward the right to prevent vibration or oscillation of the slide gear 63.

When the slide gear 63 moves to a connecting position as illustrated in the lower half of FIG. 1, the gears 9 and 67 are in mesh with each other so that the axle 3 and the right-hand front wheel 31 are connected to each other through the slide gear 63. Thus, the right-hand front wheel 31 is capable of being driven by an engine. Further, when the slide gear 63 moves to a disconnecting position as illustrated in the upper half of FIG. 1, the gears 9 and 67 are disengaged from one other so that the right-hand front wheel is disconnected from the axle 3. Thus, the right-hand front wheel is brought to a free rotating condition.

In this manner, a clutch 73 is formed for connecting and disconnecting the axle 3 to and from the right-hand front wheel.

A center plate 77 has an outer periphery thereof which is engaged with a groove 75 in an inner periphery of the housing 21. The drive gear 9 is supported by the center plate 77 through a slide bearing 79. A washer 81 is arranged between a right-hand end of the center plate 77 and the drive gear 9. A snap ring or retaining ring 83 of the center plate 77 is mounted on the drive gear 9. By the center plate 77, centering between the drive gear 9 and the housing 21 is executed so that engagement and disengagement of the gear 9 with and from gear 67 is carried out smoothly.

A plate 87 having a plurality of arms 85 is arranged between the axle 3 and the end cover 41. The arms 85 are movably inserted respectively into a plurality of tooth-broken sections 89 which are provided in the spline 61 and are fixedly mounted on the slide gear 63.

A diaphragm 91 is a resilient or elastic diaphragm which contains a retaining ring 93 at an outer edge portion of the elastic diaphragm 91. The diaphragm 91 is air-tightly mounted on an inner periphery of the top 25 by the retaining ring 93, and has an inner edge portion which is air-tightly placed between the plate 87 and a plate 95 fixedly mounted on the plate 87. A return spring 97 serving for biasing the slide gear 63 to the disengaging position is arranged between the plate 95 and the end cover 41.

In this manner, a closed chamber 99 is defined to the right of the diaphragm 91. In addition, the left-hand side of the diaphragm 91 is brought to an air-tight condition by the seals 17 and 59. Thus, an actuator 101 is formed.

As shown in FIG. 2, a check valve 105 for releasing pressure from the closed chamber 99 to the actuator 101 as indicated by an arrow 103 is provided on the diaphragm 91. As shown in FIG. 3, the check valve 105 is arranged such that a projection 107 formed on the diaphragm 91 has a forward end which is cut off along a line A—A. When the closed chamber 99 is brought to high pressure, the valve 105 is opened so that pressure escapes to the actuator 101, while, when the actuator 101 is brought to high pressure, the valve 105 is closed so that the pressure is prevented from leaking into the closed chamber 99.

Referring back to FIG. 1, an air passage 111 is defined between the axle 3 and the spindle 5, and has a right-hand end which is open to the actuator 101 and a left-hand end which communicates with an orifice 109 in the spindle 5. The orifice 109 is connected from a connecting pipe 113 to an air pump (not shown) through a control valve unit (not shown) by an air hose (not shown). Furthermore, the center plate 77 is provided with a plurality of openings 115 through which air passes.

When the pressure (normal pressure) is supplied from the air pump to the actuator 101, the diaphragm 91 is bent or flexed to the right against the return spring 97 so that the slide gear 63 moves to the engaging position through the plate 87. Thus, the clutch 73 is moved to the connecting position. As described above, at this time, pressure does not leak to the closed chamber 99 because of the check valve 105.

When the supply of pressure is halted by the control valve unit and the actuator is brought to an atmospheric opening condition, the slide gear 63 moved by the biasing force of the return spring 97 to the open or disengaging position against the biasing force of the spring 71, so that the clutch 73 is open.

When the internal pressure within the closed chamber 99 rises due to variation in heat from the brake and variation in atmosphere, or due to pressure leaking from the check valve 105 or the air-tight section of the diaphragm 91 at operation of the actuator 101, the internal pressure escapes toward the actuator 101 through the check valve 105 when the actuator 101 is brought to the atmospheric opening condition so that the internal pressure is brought to the atmospheric pressure. Accordingly, the actuator 101 operates normally without being disturbed or prevented by the internal pressure within the closed chamber 99, even if large pressure is not given to the actuator 101. Accordingly, no excessive pressure is applied to the seals 17 and 19 so that the service life of the seals 17 and 19 is prolonged.

In a manner described above, the hub clutch 1 is constructed.

When the vehicle runs in the form of 2WD, the front-wheel side is cut off by a 2-4 switching mechanism which cut off a drive system on the front-wheel side from the engine, and the left- and right-hand front wheels are cut off respectively from axles by the hub clutches so that the left- and right-hand front wheels are brought to a free rotating condition. In this manner, vibration, oscillation and noises, reduction in specific fuel consumption, wear or abrasion on various sections of the front-wheel drive system and the like are prevented.

When the engine and the front-wheel drive system are connected to each other and the hub clutches are brought to their respective connecting positions by the 2-4 switching mechanism, the vehicle is brought to the 4WD running condition so that rectilinear stability, a bad- or rough-road running ability and the like are improved.

Further, even if the vehicle runs on a bad or rough road, malfunction due to invasion of muddy water or the like does not occur due to the closed structure of the housing. Accordingly, the vehicle can execute 4WD running and 2WD running normally.

Operation of such 2-4 switching mechanism and hub clutches is arranged so as to be manually operable from an operator's or driver's seat or automatically operable in accordance with road-surface conditions and maneuvering conditions of the vehicle.

Figure 4:
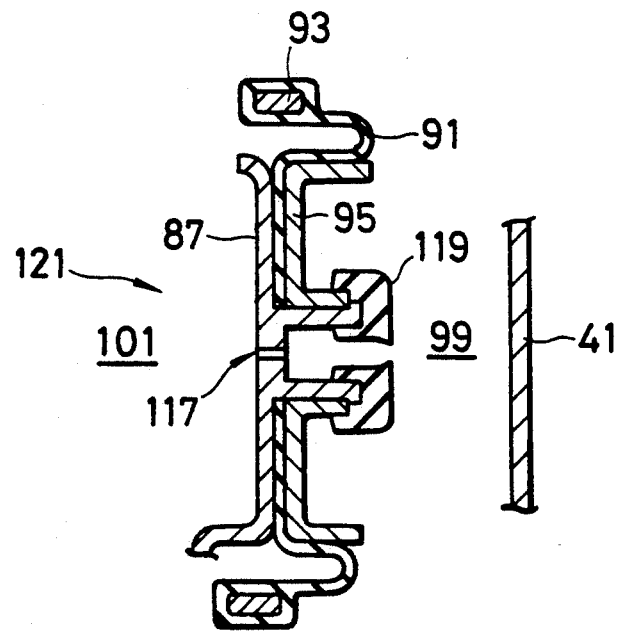
FIG. 4 is a cross-sectional view of a principal portion in a hub clutch assembly according to a second embodiment, showing a condition in which an actuator is inoperative.
Figure 5:
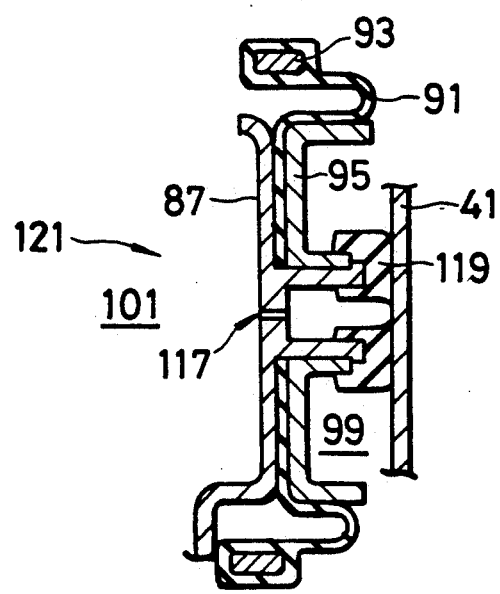
FIG. 5 is a view similar to FIG. 4, but showing a condition in which the actuator is operative.

A valve is not limited to the check valve in the first embodiment. A second embodiment illustrated in FIGS. 4 and 5 is an example thereof. Components and parts like or similar in function to those in the first embodiment are designated by the same or like reference numerals, and the description thereof will be made while the same or like reference numerals are quoted.

A minute-diameter opening 117 is provided in a plate 87, for communicating a closed chamber 99 and an actuator 101 with each other. Further, a seal 119 is air-tightly mounted on a ring-like right-hand end of a plate 95. The opening 117 and the seal 119 cooperate with each other to form a valve 121. FIG. 4 shows the actuator 101 in an inoperative condition, while FIG. 5 shows the actuator 101 in an operative condition.

When the actuator 101 operates, a diaphragm 91 moves from a position illustrated in FIG. 4 to a position illustrated in FIG. 5. At this time, because movement of the diaphragm 91 is instantaneous, although air enters the closed chamber 99 through the opening 117, an inflow resistance of the air lessens the amount of inflow. In this manner, since pressure leakage into the closed chamber 99 is substantially cut off by the valve 121, the actuator 101 operates normally. When brought to a condition illustrated in FIG. 5, the seal 119 is urged against an end cover 41 so that the valve 121 is closed. Thus, the engaging condition of a clutch 73 is maintained.

When the actuator 101 is brought to an inoperative condition, the diagram 91 is returned to the condition illustrated in FIG. 4, so that the clutch 73 is brought to the disconnecting position. Since the internal pressure within the closed chamber 99 escapes toward the actuator 101 through the opening 117 during this inoperative condition, operation of the actuator 101 is not prevented or disturbed by the internal pressure within the closed chamber 99.

Further, even if the closed chamber 99 is cooled by, for example, the outside air so that negative pressure occurs, the negative pressure escapes toward the actuator 111 through the opening 117 during the inoperative condition. Accordingly, a malfunction in which the diagram 91 is drawn toward the closed chamber 99 at the inoperative condition so that the clutch 73 is brought to the connecting position does not occur.

In connection with the above, the actuator may be one operated by negative pressure. In this case, a check valve similar to the one in the first embodiment is arranged such that a direction of fluid flow is directed or oriented toward the closed chamber from the actuator. Specifically, when internal pressure (negative pressure) occurs in the closed chamber, the fluid flows into the closed chamber from the actuator at an inoperative condition, whereby the negative pressure escapes toward the actuator from the closed chamber.

A valve should not be limited to those in the embodiments, but a valve of any other type may be used.

What is claimed is:

1. A hub clutch assembly for a vehicle which includes a drive axle and a wheel, said hub clutch assembly comprising:
    a housing of a closed structure, said wheel being fixedly mounted on said housing;
    a clutch movable between a connecting position where said housing and said drive axle are connected to each other and a disconnecting position where said housing and said drive axle are disconnected from each other;
    an actuator supplied with pressure to move said clutch to either the connecting position or the disconnecting position;
    biasing means for biasing said clutch both to said connecting and disconnecting positions;
    a closed chamber defined between said housing and said actuator; and
    check valve means provided between said actuator and said closed chamber for allowing pressure inside said closed chamber to escape into said actuator when said housing and said drive axle are disconnected from each other and for cutting off movement of pressure inside said closed chamber when said housing and said drive axle are connected to each other.

2. A hub clutch assembly according to claim 1, including a diaphragm, wherein said closed chamber is defined on one side of said diaphragm, said check valve means being provided on said diaphragm.

3. A hub clutch assembly according to claim 1, wherein said check valve means is arranged such that a projection formed on said diaphragm has a forward end which is cut off.

4. A hub clutch assembly according to claim 1, wherein, when said closed chamber is brought to high pressure, said check valve means opens so that pressure inside said closed chamber escapes to said actuator, while, when said actuator is brought to high pressure, said check valve means closes so that pressure supplied to said actuator is prevented from leaking into said closed chamber.

* * * * *